(12) United States Patent
Morimoto et al.

(10) Patent No.: US 6,377,328 B1
(45) Date of Patent: Apr. 23, 2002

(54) LIQUID CRYSTAL DISPLAY DEVICE

(75) Inventors: Hirokazu Morimoto; Tetsuya Nishino, both of Hyogo-ken (JP)

(73) Assignee: Kabushiki Kaisha Toshiba, Kanagawa-ken (JP)

( * ) Notice: Subject to any disclaimer, the term of this patent is extended or adjusted under 35 U.S.C. 154(b) by 0 days.

(21) Appl. No.: 09/296,257

(22) Filed: Apr. 22, 1999

(30) Foreign Application Priority Data

Apr. 24, 1998 (JP) ............................................. 10-114843

(51) Int. Cl.⁷ ............................................. G02F 1/1339
(52) U.S. Cl. ........................................ 349/155; 349/41
(58) Field of Search ............................... 349/155, 153, 349/161, 190, 41

(56) References Cited

U.S. PATENT DOCUMENTS

| | | | | |
|---|---|---|---|---|
| 5,458,804 A | * | 10/1995 | Yamada et al. | ............. 252/229 |
| 5,636,102 A | * | 6/1997 | Fujino et al. | ................ 361/681 |
| 5,978,061 A | * | 11/1999 | Miyazaki et al. | ............ 349/155 |
| 6,020,867 A | * | 2/2000 | Shimada et al. | ................ 345/87 |
| 6,067,144 A | * | 5/2000 | Murouchi | .................... 349/156 |
| 6,122,032 A | * | 9/2000 | Mihara et al. | ............... 349/155 |
| 6,184,967 B1 | * | 2/2001 | Laerwall et al. | ............ 349/155 |

FOREIGN PATENT DOCUMENTS

JP          10-104640          4/1998

\* cited by examiner

*Primary Examiner*—William L. Sikes
*Assistant Examiner*—Hoan C. Nguyen
(74) *Attorney, Agent, or Firm*—Pillsbury Winthrop

(57) ABSTRACT

A liquid crystal material is held between a circuit array and counter substrates. A plurality of spacers are disposed to keep a gap between the circuit array and counter substrates substantially constant. Change in distance of the gap equivalent to constriction of the liquid crystal material due to change in temperature from 20° C. to −20° C. is less than change in height of the spacers on conditions that the pressure of 100 mN/nm2 is applied between the substrates and that the liquid crystal material is not held between the substrates.

16 Claims, 5 Drawing Sheets

LIQUID CRYSTAL DISPLAY DEVICE

BACKGROUND OF THE INVENTION

1. Field of the Invention

This invention relates to a liquid crystal display device and, more particularly, to a liquid crystal display device with spacers to keep a gap between its substrates substantially constant.

2. Description of the Prior Art

A liquid crystal display device is light in weight, thin in thickness and low in power consumption so that it has been widely used in various applications. In such a liquid crystal display device, a twisted nematic (TN) type liquid crystal material is held between a pair of electrode substrates.

It is quite important to keep a gap between the electrode substrates substantially constant because, otherwise, undesired coloration occurs when the liquid crystal display device is in operation. In order to comply with such a requirement, ball-like spacers are scattered on one of the substrates in a predetermined density distribution. The substrate is then put together with another substrate. The gap is often referred to as a cell gap into which a liquid crystal material is put to complete a cell.

The ball-like spacers, however, can hardly achieve their uniform density distribution and the constant cell gap between the substrates. Further, some ball-like spacers pass light even on a light blocking mode of the liquid crystal display device. Thus, it is difficult to improve display contrast of the liquid crystal display device.

In order to solve the problems mentioned above, Japanese laid-open unexamined Patent Application Nos. 9-73093 and 9-73088 disclose column-like or square pillar spacers instead of the ball-like spacers.

The column-like or square pillar spacers are formed at predetermined places on one of the electrode substrates by using color filter materials at the same manufacturing process of color filter components. The spacer is configured to secure a uniform cell gap between the substrates and to improve display contrast.

The inventors of this patent application, however, still have found out the following problem during their research and development. Although a sufficient density of the column-like or square pillar spacers is required to maintain the load-resistance strength of a liquid crystal display device, gaseous vapor bubbles are generated between electrode substrates at lower operating temperatures. The generation of such bubbles depends on materials and density of the spacers. Change in volume of the liquid crystal material is not always adjustable with, but relatively different from, equivalent change in length of the spacers when operating or environmental temperatures fluctuate. Lower temperatures are particularly apt to cause bubbles. The bubbles affect display dignity of the liquid crystal display device.

SUMMARY OF THE INVENTION

One object of the present invention is to provide a high-dignity liquid crystal display device substantially unaffected by environmental temperature change in which spacers are disposed on a substrate.

According to one aspect of the present invention, a liquid crystal display device includes upper and lower substrates provided opposite to each other, a light modulation layer made of a liquid crystal material held between the substrates under a low pressure, a plurality of spacers formed on the upper and/or lower substrates to maintain a cell gap between the substrates and a display region made of a plurality of pixels. The liquid crystal display device is characterized in that change in the cell gap equivalent to constriction in volume of the liquid crystal material caused by temperature fluctuation from 20° C. to −20° C. is smaller than change in length of the spacers at the environmental temperature of −20° C. on the condition that the pressure of 100 mN/mm$^2$ is applied to the substrates between which the liquid crystal material is not held.

With that structure, the cell gaps can be adjusted in response to thermal constriction of the liquid crystal material at lower temperatures so that the generation of bubbles is prevented.

According to another aspect of the present invention, a liquid crystal display device also includes upper and lower substrate provided opposite to each other, a light modulation layer made of a liquid crystal material held between the substrates, a plurality of spacers formed on the upper and/or lower substrates to maintain a cell gap between the substrates and a display region including a plurality of pixels. This liquid crystal display device is characterized in that change X in length of the spacers at the environmental temperature of −20° C. is more than 0.1 $\mu$m while change Y at the environmental temperature of 20° C. is less than 2X $\mu$m on the condition that the pressure of 100 mN/mm$^2$ is applied to the substrate between which the liquid crystal material is not held.

With this particular structure, the spacers sufficiently change in length even at the environmental temperature of −20° C. to adjust the cell gaps in response to the thermal constriction of the liquid crystal so that the generation of bubbles are effectively prevented. Further, since the length change Y of the spacers at the environmental temperature of 20° C. is controlled to be less than 2X $\mu$m, the function of the spacers to maintain uniform cell gaps is not substantially affected. Thus, the generation of bubbles is further prevented while the uniform cell gaps are maintained in a wide temperature range.

The above-stated and other objects and advantages of the invention will become apparent from the following description when taken with the accompanying drawings. It will be understood, however, that the drawings are for purposes of illustration and not to be construed as defining the scope or limits of the invention, reference being had for the latter purpose to the claims appended hereto.

DETAILED EXPLANATION OF THE PREFERRED EMBODIMENT

Figure 1:
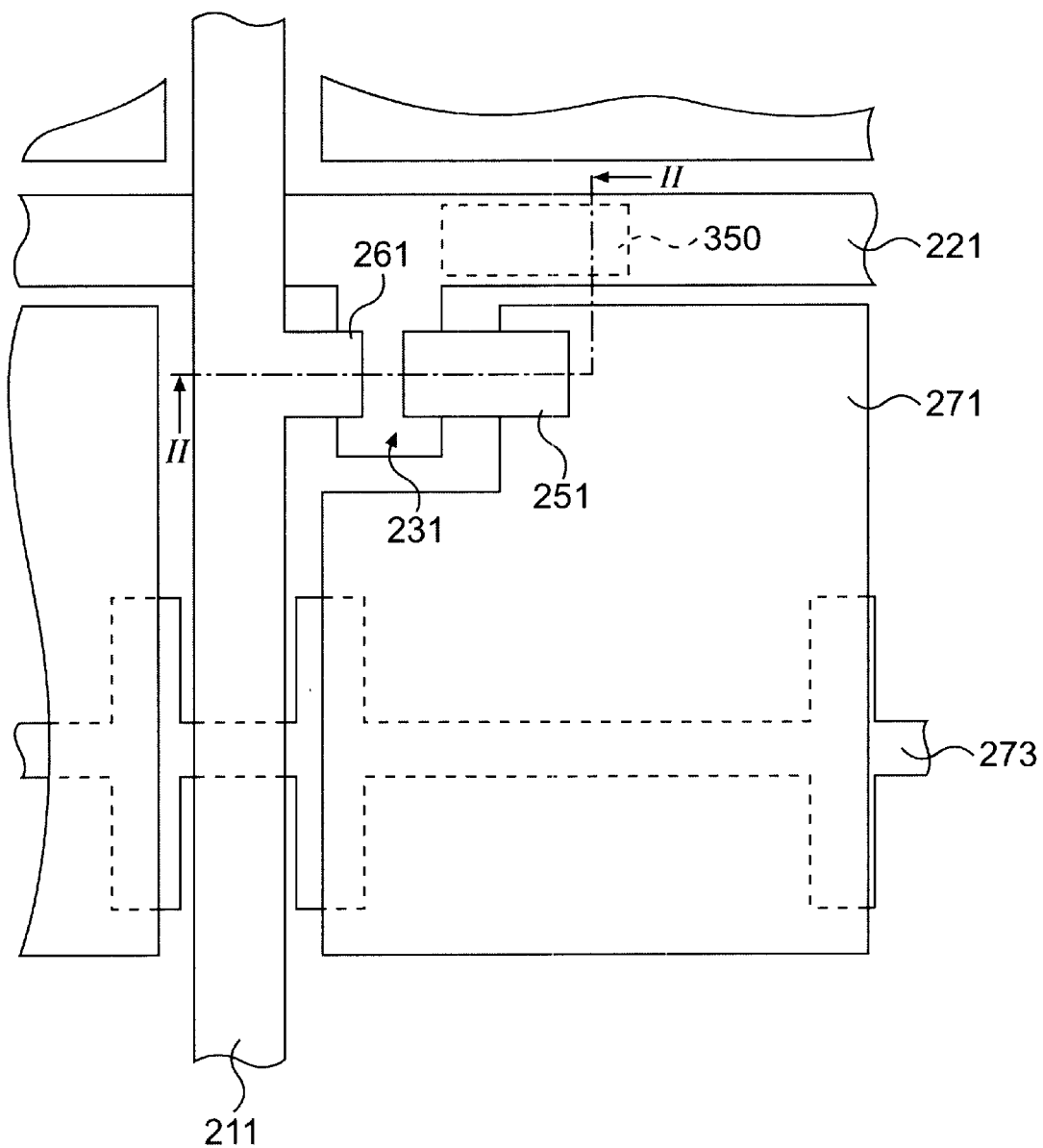
FIG. 1 is a schematic plan view of a circuit array substrate in a liquid crystal display device of the present invention.

First, principles of the present invention will be briefly explained hereinafter. In order to prevent the generation of bubbles, spacers of the invention are used to follow change in volume of a liquid crystal material due to environmental temperature variations. The inventors' experiment has revealed that the cell gap constriction is caused by change in volume of a liquid crystal material in response to the environmental temperature variations. Depending on materials and structure of a cell gap, and cell gap shrinks by about 0.09 $\mu$m, for instance, due to the environmental temperature change from 20° C. to 0° C. on the condition that the liquid crystal material No. TC-5140 manufactured by Chisso Corporation is put into the cell gap of 5 $\mu$m of the liquid crystal display device which has an effective rectangular display region with 12.1 -inch diagonal length. The cell gap reduced by more than 0.1 $\mu$m, e.g., by about 0.15 $\mu$m, in response to the environmental temperature variations from 0° C. to –20° C. in the same liquid crystal display device.

If such change in length of the spacers equivalently follows the change in volume of the liquid crystal material, the bubbles are not generated. Thus, the change in distance of the cell gap equivalent to the constriction in volume of the liquid crystal material caused by the temperature fluctuation from 20° C. to –20° C. is smaller than that in length of the spacers at the environmental temperature of –20° C. on the condition that the pressure of 100 mN/mm$^2$ is applied to the substrates between which the liquid crystal material is not held.

A result of the inventors' experiment has indicated that the generation of bubbles at a low environmental temperature can be prevented if change X in length of the spacers at the environmental temperature of –20° C. is more than 0.1 $\mu$m while change Y at the environmental temperature of 20° C. is less than 2X $\mu$m in the case of the pressure of 100 mN/mm$^2$ applied to the substrates between which the liquid crystal material not held.

Another result of the inventors' experiment has further revealed that, in order to comply with the requirement set forth immediately above, although the spacers are also subject to its temperature dependency, the change in length of the spacers is desirably more than 0.3 $\mu$m on the conditions that the weight of 30 mN is loaded on the spacer sectional area in equivalence of 100 $\mu$m$^2$ and that the spacer is 5 $\mu$m in height at the environmental temperature of 20° C. If the change in height is more than 0.3 $\mu$m, its minimum required change can be achieved even at the environmental temperature of –20° C. However, if it is less than 0.3 $\mu$m, the change in response to the density of spacers can hardly be controlled.

The change in length of the spacer is desirably less than 2.0 $\mu$m on the conditions that the weight of 60 mN is loaded on the spacer sectional area in equivalence of 100 $\mu$m$^2$ and the spacers are 5 $\mu$m in height at the environmental temperature of 20° C. If it is less than 2.0 $\mu$m, the spacers are hardly subject to undesirable deformation during the manufacturing process. However, if it is larger than 2.0 $\mu$m, the change in response to the density of spacers cannot be easily controlled.

Preferably, the spacers are disposed in a predetermined density. such density ranges from 500 $\mu$m$^2$/mm$^2$ to 3,000 $\mu$m$^2$/mm$^2$, and, more desirably, is set in the range from 700 $\mu$m$^2$/mm$^2$ to 2,000 $\mu$m$^2$/mm$^2$. Within those ranges, the spacers can maintain a substantially uniform cell gap and can reduce the generation of bubbles against the environmental temperature variations. If the density of spacers is less than 500 $\mu$m$^2$/mm$^2$, an uneven cell gap is caused by the pressure applied during the manufacturing process possibly resulting in poor display quality. However, if the density of spacers is more than 3,000 $\mu$m$^2$/mm$^2$, it may cause the generation of bubbles.

The spacers are disposed at places where effective image display is not substantially affected. Preferably, the spacers are disposed on signal or scanning lines or switching elements of the array substrate. In order to maintain a constant call gap, the spacers are uniformly provided at those places in the display region. Thus, the density distribution of the spacers and the sectional area of each spacer are determined to comply with such requirements.

Figure 2:
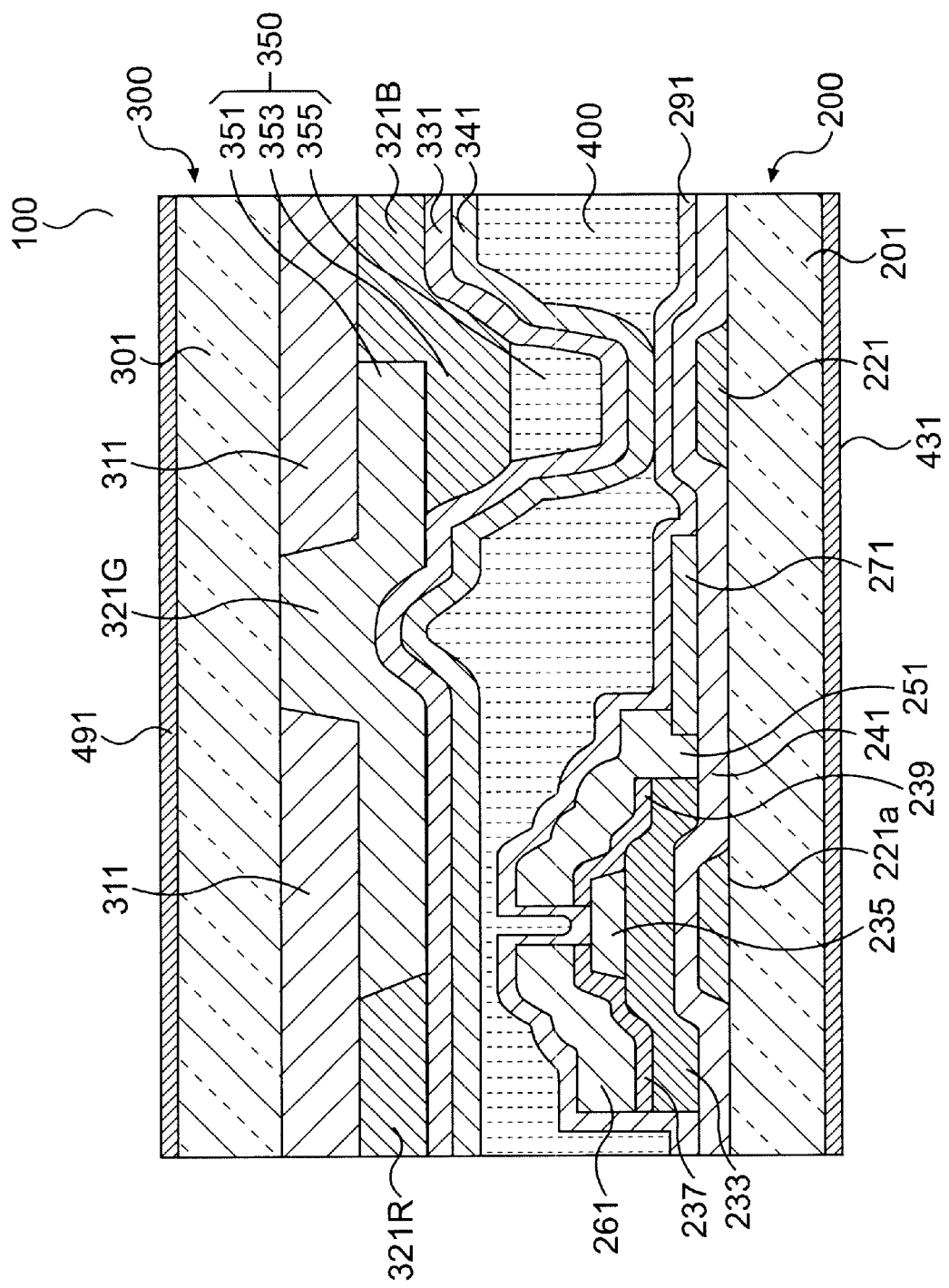
FIG. 2 is a sectional view of the array substrate taken along a line II—II' shown in FIG. 1.

An embodiment of a liquid crystal display device of the invention will be described hereinafter with reference to the drawings. As shown in FIGS. 1 and 2, a liquid crystal display device 100 includes a circuit array substrate 200, a counter substrate 300 provided opposite to the substrate 200, and a liquid crystal layer 400 functioning as an optical modulation layer. The liquid crystal display device 100 is further provided with a driver circuit unit (not shown) and a surface illumination source (not shown either) on the side of the array substrate 200.

The array substrate 200 includes a 0.7 mm thick, transparent glass substrate 201, matrix-like crossing lines at a right angle of (1024×3) signal lines 211 and 786 scanning lines 221 disposed on the glass substrate 201, and thin-film transistors (TFTs) 231 in the vicinities of the crossing points of the lines 211 and 221. The signal lines 211 are made of molybdenum/aluminum/molybdenum layers while the scanning lines 221 made of molybdenum-tungsten (MoW) alloy.

The TFT 231 consists of a gate electrode 221a, a gate isolation layer 241, a semiconductor channel layer 233, a channel protection layer 235, and source and drain electrodes 251 and 261. The gate electrode 221a extends from the scanning line 221 and is disposed on the glass substrate 201. The gate isolation layer 241 made of silicon nitride (SiNx) covers the gate electrode 221a and the glass substrate 201. The semiconductor channel layer 233 is made of hydrogen amorphous silicon (a–Si:H). The channel protection layer 235 made of silicon nitride (SiNx) is formed on the semiconductor channel layer 233. The source and drain electrodes 251 and 261 are made of phosphorus doped, low resistance, hydrogen amorphous silicon semiconductor (n+a–si:H) layers.

The drain electrode 261 is integrated with the signal line 211. The source electrode 251 is made of the same molybdenum/aluminum/molybdenum layer as the scanning line 211 and is electrically connected to a transparent pixel electrode 271 made of an indium tin oxide (ITO) layer.

A storage capacitor line 273 is formed in parallel with the scanning line 221 during the same manufacturing process of the scanning line 221. The storage capacitor 273 and the pixel electrode 271 provided opposite to each other are configured to make up a storage capacitor. The array substrate 200 is covered with an alignment layer 291 as its top layer.

In this embodiment the liquid crystal display device conforms to the Super Video Graphic Application (SVGA) Specification: the effective display region with 12.1 inches in diagonal length, (1024×3)×786 pixels, 102.5 $\mu$m×307.5 $\mu$m in pixel pitch, and 1024×786 matrix-like display picture elements.

The counter substrate 300 includes a 0.7 mm thick glass substrate 301; a light blocking layer 311; red, blue, and green color filters 321R, 321B and 321G; a transparent counter electrode 331 made of ITO; and an alignment layer 341. The light blocking layer 311 is disposed on the glass substrate to prevent light from leaking through gaps between the signal line 211 and the pixel electrode 271 and the ones between the scanning line 221 and the pixel electrode 271, respectively. The color filters 321R, 321B, and 321G are respectively provided between the light blocking layers 311. The counter electrode 331 and the alignment layer 341 are disposed below the color filters 321 and the counter electrode 331, respectively.

The cell gap between the array and counter substrates 200 and 300 is kept substantially 5.0 $\mu$m by a column-like or square pillar spacer 350. A liquid crystal layer 400 made primarily of a TN liquid crystal material, such as material No. TC-5140 manufactured by Chisso Corporation, is held in the gap under a quite low pressure.

The spacer 350 is made of multi-layer components 351, 353 and 355. The multi-layer components are made of the same materials as those of the green, blue and red color filters 321G, 321B and 321R, respectively. The spacer 350 is disposed at such a place that it does not affect substantially the display dignity, e.g., the scanning line 221.

Figure 3:
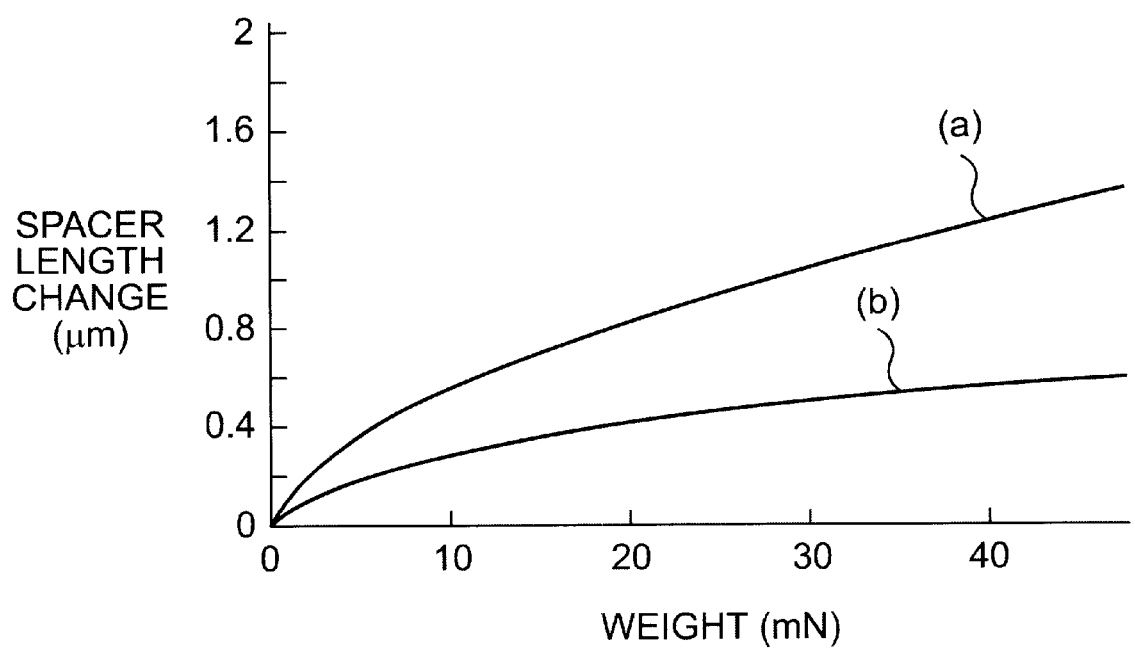
FIG. 3 illustrates graphs to show the dependency of change in length of the spacers and weight loaded on the liquid crystal display device.

As the requirement of the spacer has been set forth above, the change in length of the spacer 350 is substantially equivalent to more than 0.3 $\mu$m under the loaded weight of 30 mN per its 100 $\mu$m$^2$ sectional area on the condition that the spacer is 5 $\mu$m in height at the temperature of 20° C. while it is substantially equivalent to less than 2.0 $\mu$m under the loaded weight of 60 mN per its sectional area in equivalence of 100 $\mu$m$^2$ under the same condition. For instance, the former and latter are 1.0 $\mu$m and 1.6 $\mu$m, respectively, as shown in the graph (a) of FIG. 3. The spacer 350 is made of a polyimide system resin.

In greater detail, if this particular material of the spacer is of relatively large change due to the applied pressure, the change "Y" in response to the pressure "X" is given by the following equation:

$$Y = 0.13 \, X^{0.6}$$

Further, the spacer 350 in this embodiment is a square pillar with (10 $\mu$m×10 $\mu$m) in cross section, its density distribution is 4 spacers/9 pixels, i.e., 1,410 $\mu$m$^2$/mm$^2$, and the spacers are uniformly disposed in the effective display region.

Figure 4:
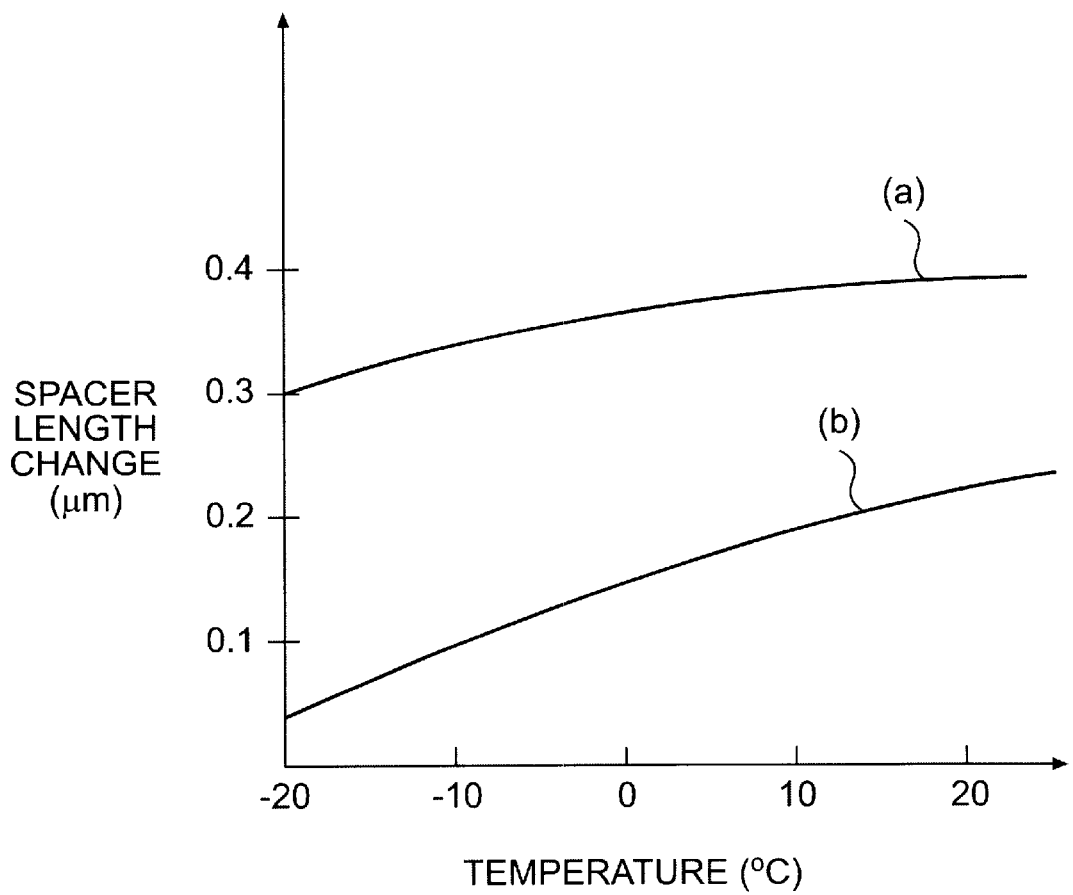
FIG. 4 illustrates with a graph to show temperature dependency of change in length of the spacers under different weight.

If the pressure of 100 mN/mm$^2$ is applied to the substrate 200 and 300 without the liquid crystal material held at the environmental temperature of −20° C., the change in length of the spacer 350 is 0.3 $\mu$m as shown in the graph (a) of FIG. 4. This is greater than the cell gap reduction of 0.15 $\mu$m which is substantially equivalent to the constriction in volume of the liquid crystal material in response to temperature change from 20° C. to −20° C. When the pressure of 100 mN/mm$^2$ is applied between the array and counter substrates 200 and 300 without the liquid crystal material held, the change in length of the spacer 350 is 0.4 $\mu$m at the environmental temperature of 20° C. which is two times that shown or less at the temperature of −20° C.

The inventors' measurement has shown that the uniformity distribution of the cell gaps is less than 0.1 $\mu$m in dispersion in the effective display region of the embodiment described above. Their visual examination of the embodiment in operation has shown that the generation of bubbles is not recognized at the environmental temperature range from −20° C. to 60° C.

Figure 5:
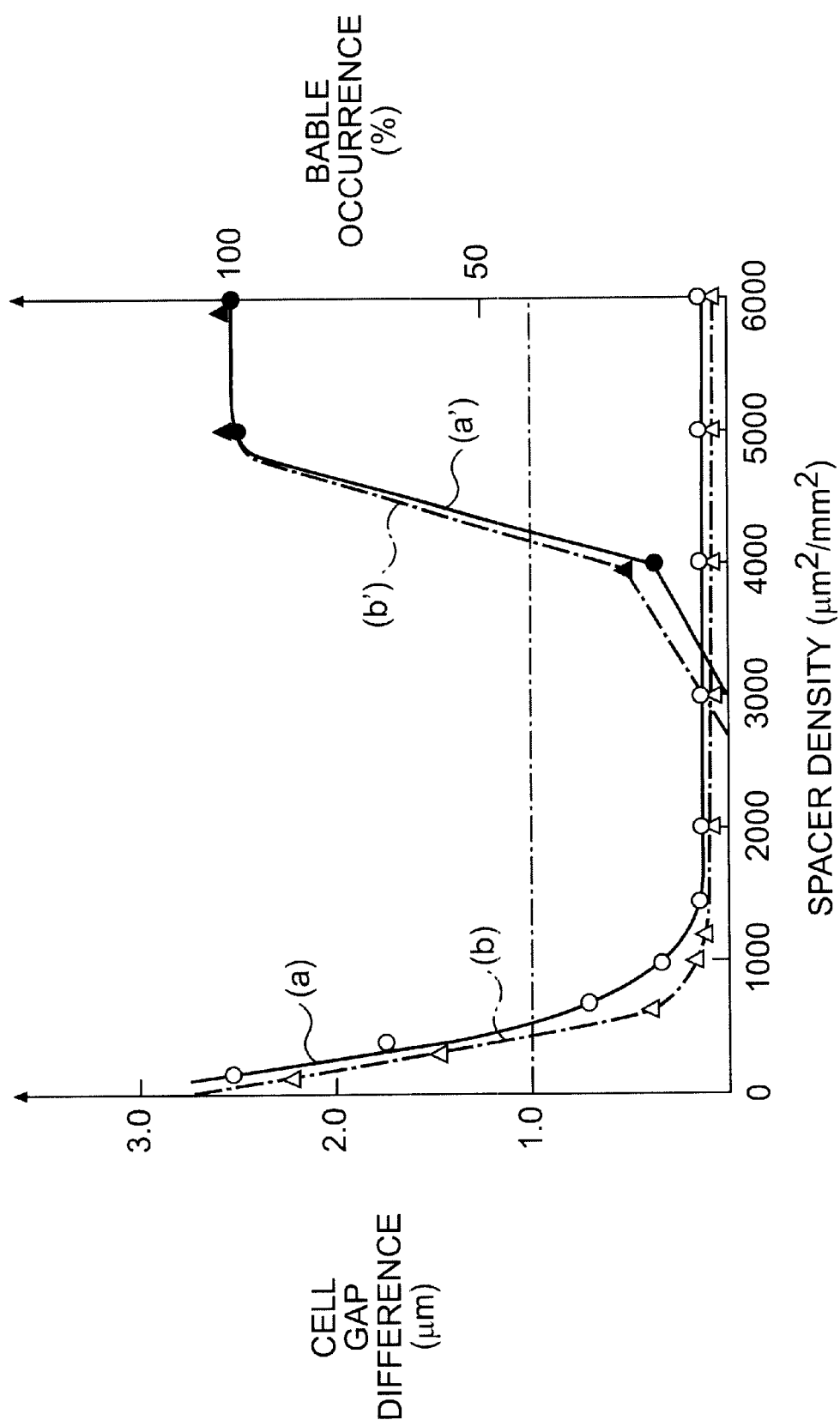
FIG. 5 indicates a graph to show the relationship between cell gap unevenness as well as bubble generation and spacer density.

The inventors have carried out the same measurement of a liquid crystal display device which is similar in structure to the one set forth above but is changed in distribution density of the spacers. The measured data are shown in FIG. 5 in which the curve (a) illustrates the relationship between the spacer density and the cell gap dispersion while the curve (a') indicates that between the spacer density and the occurrence frequency of bubbles. As shown in FIG. 5, good results are gained in the desirable spacer density range from 500 $\mu$m$^2$/mm$^2$ to 3,000 $\mu$m$^2$/mm$^2$, particularly from 700 $\mu$m$^2$/mm$^2$ 2,000 $\mu$m$^2$/mm$^2$ although the spacer density of the present embodiment is 1,410 $\mu$m$^2$/mm$^2$.

Further, the spacer 350 used in this embodiment is made of an acrylic system resin with the following physical properties: the change in length of the spacer 350 is more than 0.3 $\mu$m, i.e., 0.4 $\mu$m at the ordinary temperature of 20° C. on the condition that the spacer 350 is 5 $\mu$m in height and receives the loaded weight of 30 mN per its equivalent sectional area of 100 $\mu$m$^2$ and the change in height is less than 2.0 $\mu$m, i.e., 0.5 $\mu$m at the temperature of 20° C. on the condition that the spacer 350 is 5 $\mu$m in height and receives the loaded weight of 60 mN per its equivalent sectional area of 100 $\mu$m$^2$.

The spacer material is, preferably, relatively large in load-deformation as expressed by the following equation:

$$Y = 0.09 \, X^{0.4}$$

where Y and X are a load-deformation change and load, respectively. Another embodiment of the spacer 350 is 10 $\mu$m×10 $\mu$m in sectional area contacting the array substrate 200. Its density distribution is 3 spacers/9 pixels, i.e., 1,058 $\mu$m$^2$/mm$^2$ which is less than the previous embodiment. Those spacers are uniform in distribution in the effective display region.

Its characteristic is shown by the curve (b) in FIG. 4. As indicated, the spacer 350 changes in length of 0.15 $\mu$m at the temperature of −20° C. on the conditions that the liquid crystal material is not held between the array and counter substrates 200 and 300 and the pressure of 100 mN/mm$^2$ is applied between the substrates 200 and 300. This is substantially equal to the cell gap reduction of about 0.15 $\mu$m which is equivalent to the constriction in volume of the liquid crystal material at the temperature change from 20° C. to −20° C. When the pressure of 100 mN/mm$^2$ is applied between the array and counter substrates 200 and 300 without the liquid crystal material held, the spacer 350 changes in length of 0.24 $\mu$m at the environmental temperature of 20° C. which is two times that shown or less at the temperature of −20° C.

The inventors' measurement has indicated that the distribution of the cell gaps is less than 0.1 $\mu$m in dispersion in the effective display region of the present embodiment. Their visual examination of the embodiment in operation has shown that the generation of bubbles is not recognized at the environmental temperature range from −20° C. to 60° C.

The inventors also have carried out the same measurement of a liquid crystal display device which is similar in structure to the one set forth above but is changed in distribution density of the spacers. The measured data are shown in FIG. 5 in which the curve (b) illustrates the relationship between the spacer density and the cell gap dispersion while the curve (b') indicates that between the spacer density and the occurrence frequency of bubbles. As shown in FIG. 5, good results are gained in the desirable spacer density range from 500 $\mu$m$^2$/mm$^2$ to 3,000 $\mu$m$^2$/mm$^2$, particularly from 700 $\mu$m$^2$/mm$^2$ to 2,000 $\mu$m$^2$/mm$^2$ although the spacer density of the present embodiment is 1,058 $\mu$m$^2$/mm$^2$.

As different embodiments of this invention may be made without departing from the spirit and scope thereof, it is to be understood that the invention is not limited to its specific embodiments described herein. The structure or material of components may be different from that of those shown in FIGS. 1 through 5. The spacer 350, for instance, can be made of two elements of the color filter and other materials added thereto by using a patterning method well known in the semiconductor manufacturing art. Further, as one of still other alternatives, the spacer 350 may be made of the same materials as the color filters 321R, 321B and 321G and other materials piled thereon by using the patterning method.

Although the spacers 350 are disposed below the counter substrate 300 as in the embodiments described so far, they may also be disposed on the array and/or counter substrates 200 and/or 300. The spacers are disposed between the array and counter substrates 200 and 300 which, in turn, are joined together.

The spacers 350 are disposed on the scanning lines 221 in the embodiments. However, as far as an aperture ratio remains substantially unchanged, they may be disposed on signal lines 211, TFTs 231 and the like. Since the counter electrode 331 is placed on the spacers 350, the structure thereof is quite effective to electrically isolate the counter electrode 331 from the scanning lines 221 on the condition that the spacers 350 are disposed on the scanning lines 221 as in the embodiments described above.

This invention is applicable not only to the TN mode liquid crystal display devices but also to other modes thereof such as a birefringence effect or guest-host mode liquid crystal display device.

According to the present invention, column-like or square pillar spacers are configured to change in shape in response to thermal constriction of liquid crystal materials so that they prevent bubbles from generating in the latter. As a result, the present invention can provide a liquid crystal display device with good display dignity, high contrast ratio and anti-environment features.

What we claim is:

1. A liquid crystal display device, comprising:
   a pair of first and second substrates provided opposite to each other;
   a light modulation layer including a liquid crystal material held between said first and second substrates;
   a plurality of column-like or square spacers disposed on said first substrate to maintain a gap between said first and second substrates; and
   a display region including a plurality of pixels, wherein a change in distance of said gap, equivalent to a constriction of said liquid crystal material due to a change in temperature from 20° C. to −20° C., is less than a change in height of said spacer when a pressure of 100 mN/mm² is applied between said first and second substrates and said liquid crystal material is not held between said first and second substrates.

2. The liquid crystal display device according to claim 1, wherein the change in height of said spacers is more than 0.3 μm at the temperature of 20° C. when a weight of 30 mN per 100 μm² is loaded on said spacers.

3. The liquid crystal display device according to claim 1, wherein the change in height of said spacers is more than 2.0 μm at a temperature of 20° C. when a weight of 60 mN per 100 m² is loaded on said spacers.

4. The liquid crystal display device according to claim 1, wherein said spacers are 500 μm²/mm² through 3,000 μm²/mm² in distribution density.

5. The liquid crystal display device according to claim 4, wherein said spacers are 700 μm²/mm² through 2,000 μm²/mm² in distribution density.

6. The liquid crystal display device according to claim 1, wherein said display region is substantially rectangular in shape with 12-inch diagonal length or more.

7. The liquid crystal display device according to claim 1, wherein said first substrate further includes a plurality of signal and scanning lines disposed in a matrix form and said display region further includes switching elements connected to said pixels.

8. The liquid crystal display device according to claim 7, wherein said spacers are disposed on one of said signal lines, said scanning lines and said switching elements.

9. A liquid crystal display device comprising:
   a pair of first and second substrates provide opposite to each other;
   a light modulation layer including a liquid crystal material held between said first and second substrates;
   a plurality of spacers disposed on said first substrate to maintain a gap between said first and second substrates; and
   a display region including a plurality of pixels,
   wherein change X in height of said spacers at an environment temperature of −20° C. is more than 0.1 μm on conditions that the pressure of 100 mN/mm² is applied between said first and second substrates and that said liquid crystal material is not held between said first and second substrates, and wherein change Y in height of said spacers at the temperature of 20° C. is less than 2X on said conditions.

10. The liquid crystal display device according to claim 9, wherein the change in height of said spacers is more than 0.3 μm at the temperature of 20° C. when a weight of 30 mN per 100 μm² is loaded on said spacers.

11. The liquid crystal display device according to claim 9, wherein the change in height of said spacers is more than 2.0 μm at a temperature of 20° C. when a weight of 60 mN per 100 m² is loaded on said spacers.

12. The liquid crystal display device according to claim 9, wherein said spacers are 500 μm²/mm² through 3,000 μm²/mm² in distribution density.

13. The liquid crystal display device according to claim 12, wherein said spacers are 700 μm²/mm² through 2,000 μm²/mm² in distribution density.

14. The liquid crystal display device according to claim 9, wherein said display region is substantially rectangular in shape with 12-inch diagonal length or more.

15. The liquid crystal display device according to claim 9, wherein said first substrate further includes a plurality of signal and scanning lines disposed in a matrix form and said display region further includes switching elements connected to said pixels.

16. The liquid crystal display device according to claim 15, wherein said spacers are disposed on one of said signal lines, said scanning lines and said switching elements.

* * * * *